(12) United States Patent
Maeda (10) Patent No.: US 7,869,692 B2
(45) Date of Patent: Jan. 11, 2011

(54) IMAGING APPARATUS (75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1131 days.

(21) Appl. No.: 11/338,112

(22) Filed: Jan. 24, 2006

(65) Prior Publication Data

US 2006/0171686 A1 Aug. 3, 2006

(30) Foreign Application Priority Data

Feb. 3, 2005 (JP) ............................. 2005-027867

(51) Int. Cl.
*H04N 5/00* (2006.01)
*H04N 5/76* (2006.01)
*H04N 5/91* (2006.01)
*H04N 7/00* (2006.01)
*H04N 9/79* (2006.01)
*G11B 5/027* (2006.01)
*G11B 15/00* (2006.01)
*G11B 15/12* (2006.01)

(52) U.S. Cl. ............................. 386/117; 386/7; 386/46; 386/96; 386/104; 386/120; 386/121; 348/231.6; 348/231.9; 360/62; 360/83; 360/85; 360/95

(58) Field of Classification Search ................. 386/117, 386/46, 96, 104, 120, 121, E5.072, 7, E9.103; 348/231.6, 231.9, E5.038; 360/62, 83, 85, 360/95; G9B/15.002, 15.022, 19.002, 27.012, G9B/27.019, 27.021, 27.05, 27.051, 27.052, G9B/20.001, 27.002, 27.033
See application file for complete search history.

(56) References Cited

U.S. PATENT DOCUMENTS

| 4,554,604 | A | * | 11/1985 | Koyama ....................... 360/95 |
| 4,829,556 | A | * | 5/1989 | Hashimoto .................... 379/79 |
| 6,052,510 | A | * | 4/2000 | Sakaegi et al. .............. 386/120 |
| 6,330,392 | B1 | | 12/2001 | Nakatani et al. |
| 6,351,600 | B1 | * | 2/2002 | Oeda et al. ..................... 386/96 |
| 6,549,232 | B1 | * | 4/2003 | Taniguchi et al. ....... 348/231.99 |
| 6,577,805 | B1 | | 6/2003 | Hirai |
| 7,236,689 | B2 | | 6/2007 | Maeda et al. |

(Continued)

FOREIGN PATENT DOCUMENTS

CN 1246955 A 3/2000

(Continued)

*Primary Examiner*—Thai Tran
*Assistant Examiner*—Syed Y Hasan
(74) *Attorney, Agent, or Firm*—Canon U.S.A., Inc. I.P. Division (57) ABSTRACT

An imaging apparatus includes an imaging unit, a recording and reproduction unit configured to record a serial moving image signal generated by the imaging unit as one cut on a recording medium during a period from an instruction to start photographing to an instruction to stop photographing, and to reproduce a moving image signal recorded on the recording medium, a mode setting unit configured to selectively setting one of a reproduction mode for reproducing a moving image signal recorded on the recording medium and a recording mode for recording a moving image signal on the recording medium, and a control unit configured to, responsive to an instruction to start reproduction in the reproduction mode, control the recording and reproduction unit to reproduce a moving image signal starting with a cut recorded first among a plurality of cuts recorded within a predetermined time period.

6 Claims, 7 Drawing Sheets

U.S. PATENT DOCUMENTS

| | | | |
|---|---|---|---|
| 2002/0101518 A1* | 8/2002 | Suda | 348/231 |
| 2003/0215209 A1* | 11/2003 | Kawaguchi | 386/7 |
| 2004/0126089 A1 | 7/2004 | Suzuki | |
| 2005/0063669 A1 | 3/2005 | Kato et al. | |

FOREIGN PATENT DOCUMENTS

| | | |
|---|---|---|
| CN | 1489865 A | 4/2004 |
| CN | 1515008 A | 7/2004 |
| CN | 1516455 A | 7/2004 |
| EP | 0860829 A2 | 8/1998 |
| JP | 10-234002 A | 9/1998 |
| JP | 11-215458 A | 8/1999 |
| JP | 2000-138888 A | 5/2000 |
| JP | 2001-291376 A | 10/2001 |

\* cited by examiner

REPRODUCE CONTENT 501 → STOP REPRODUCTION
→ CAMERA MODE → REPRODUCTION MODE
→ INSTRUCTION FOR REPRODUCTION

FIG.5B

REPRODUCE CONTENT 501 → STOP REPRODUCTION → CAMERA MODE
→ RECORD CONTENTS 502 AND 503 → REPRODUCTION MODE
→ INSTRUCTION FOR REPRODUCTION → STOP REPRODUCTION
→ CAMERA MODE → RECORD CONTENT 504 → REPRODUCTION MODE
→ INSTRUCTION FOR REPRODUCTION

FIG.5C

REPRODUCE CONTENT 501 → STOP REPRODUCTION → CAMERA MODE
→ RECORD CONTENT 505 → TURN OFF POWER SOURCE
→ TURN ON POWER SOURCE → RECORD CONTENT 506
→ REPRODUCTION MODE → INSTRUCTION FOR REPRODUCTION

FIG.7A

REPRODUCE CONTENT 701 → STOP REPRODUCTION
→ CAMERA MODE → RECORD CONTENT 702
→ PREDETERMINED PERIOD ELAPSED
→ RECORD CONTENT 703 → REPRODUCTION MODE
→ INSTRUCTION FOR REPRODUCTION

FIG.7B

REPRODUCE CONTENT 701 → STOP REPRODUCTION
→ CAMERA MODE → RECORD CONTENT 704 → NEXT DAY
→ RECORD CONTENT 705 → REPRODUCTION MODE
→ INSTRUCTION FOR REPRODUCTION

IMAGING APPARATUS

BACKGROUND OF THE INVENTION

1. Field of the Invention

The present invention relates to an imaging apparatus, and more particularly, to control of a reproduction starting position of image data captured by the imaging apparatus.

2. Description of the Related Art

In recent years, recording apparatuses which record and reproduce image data or audio data on or from a DVD (Digital Versatile Disc) or a flash memory have been widely used. The DVD is a recording medium having a large capacity of 4.7 GB (gigabyte) and can be used to record a high-quality video image compliant with the conventional S-VHS (Super VHS) standard for about 2 hours using an image compression encoding processing technique in MPEG-2 (Moving Picture Experts Group 2).

Further, an apparatus capable of recording a television broadcast program using such a recording medium has been proposed (for example, see Japanese Patent Application Laid-Open No. 2001-291376). When a television broadcast program is recorded, a broadcasting time of one program is about from 30 minutes to 1 hour. Accordingly, four contents (or files) can be recorded in one disc at most. Therefore, a user can easily locate or find the desired content during reproduction.

On the other hand, a disc video camera has also been proposed in recent years, in which a moving image captured by the camera is recorded on such a disc. In the disc video camera, the recording time of one scene may be less than a minute. Therefore, about 100 contents can be recorded on one disc.

Nevertheless, many times when a content is recorded on a disc or other recording medium on which many contents are already recorded, it can be hard for a user to locate and reproduce a desired recorded content from among many contents recorded on the disc.

SUMMARY OF THE INVENTION

An aspect of the present invention is to overcome the above-described drawbacks.

Another aspect of the present invention is directed to an imaging apparatus configured to reproduce a not yet reproduced content with an easy operation and to set a reproduction starting position for such a content to an optimal position according to an operation condition in photographing.

In one exemplary embodiment of the present invention, an imaging apparatus includes an imaging unit configured to generate an image signal by photographing a subject, a recording and reproduction unit configured to record a serial moving image signal generated by the imaging unit as one cut on a recording medium during a period from an instruction to start photographing to an instruction to stop photographing, and to reproduce a moving image signal recorded on the recording medium, a mode setting unit configured to selectively set one of a reproduction mode for reproducing a moving image signal recorded on the recording medium and a recording mode for recording a moving image signal on the recording medium, and a control unit configured to, responsive to an instruction to start reproduction in the reproduction mode, control the recording and reproduction unit to reproduce a moving image signal starting with a cut recorded first among a plurality of cuts recorded within a predetermined time period.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

DETAILED DESCRIPTION OF THE EMBODIMENTS

Exemplary embodiments, features and aspects of the present invention will now be herein described in detail below with reference to the drawings.

First Exemplary Embodiment

[Exemplary Imaging Apparatus]

Figure 1:
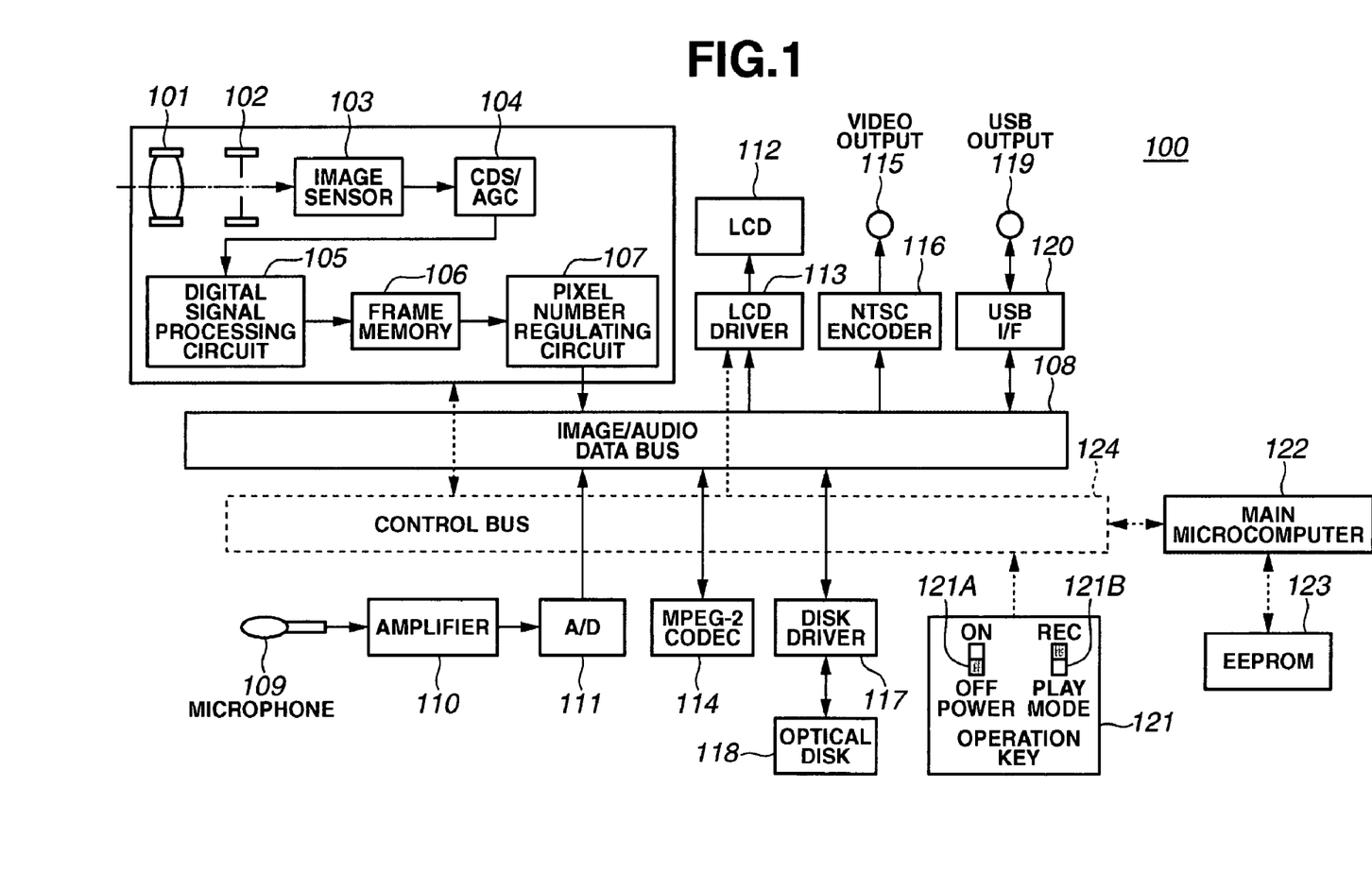
FIG. 1 is a block diagram showing an exemplary architecture of a video camera according to an embodiment of the present invention.

A digital video camera 100 serving as an imaging apparatus according to a first embodiment of the present invention is described first. FIG. 1 is a block diagram schematically showing an exemplary architecture of a digital video camera 100 according to the first embodiment of the present invention.

In FIG. 1, a photographic lens 101 is configured to receive light from a subject. A diaphragm 102 is configured to control the quantity of light incident on an image sensor 103. The image sensor 103 is configured to convert the received subject image into an image signal. A CDS (correlated double sampling)/AGC (automatic gain control) circuit 104 is configured to sample and hold the image signal at an appropriate signal level.

A digital signal processing circuit 105 is configured to convert the image signal from the CDS/AGC circuit 104 into a digital signal to thereby perform a digital signal process. A frame memory 106 is configured to store data from the digital signal processing circuit 105 for each frame. A pixel number regulating circuit 107 is configured to convert image data stored in the frame memory 106 into image data having a suitable pixel number according to a coding system such as the MPEG-2 system or the like.

An image/audio data bus 108 is configured to allow image data and audio data to be transferred between the various components of the video camera 100. A microphone 109 is configured to collect sound to be recorded on an optical disc or the like together with image data. An amplifier 110 is configured to amplify an audio signal from the microphone 109 to an appropriate level. An A/D converter 111 is configured to convert the amplified audio signal into a digital audio signal.

A liquid crystal display (LCD) 112 or the like is configured to display reproduced image data from an MPEG-2 codec 114 during a reproduction mode and to display a video image captured by the image sensor 103 during photographing. A liquid crystal driver (LCD) 113 is configured to drive the liquid crystal display 112.

The MPEG-2 codec 114 is configured to compress a digital image signal from the image/audio data bus 108 as a moving image according to the MPEG-2 system during photographing, and to expand a reproduced MPEG-2 compressed data during reproduction.

A video output terminal 115 is configured to output an analog video signal from an NTSC encoder 116. The NTSC encoder 116 is configured to output an image signal corresponding to that displayed on the liquid crystal display 112 to the video output terminal 115.

A disc driver 117 is configured to read and write data from or to an optical disc 118. A USB terminal 119 is configured to output data from a USB interface 120. The USB interface 120 is configured to output coded image data in the MPEG-2 system recorded on the optical disc 118 to the outside of the digital video camera 100.

An operation key 121 includes a power source switch 121A, a mode switch 121B, and may further include other various switches (not shown). The power source switch 121A is operable for turning on/off the power source of the main body. The mode switch 121B is operable for selecting one of a camera (recording) mode and a reproduction mode.

A main microcomputer 122 is configured to control the mode of the whole digital video camera and to detect the operation of the operation key 121 to thereby control performance of various functions.

An EEPROM 123 is a nonvolatile memory configured to store the state of the main microcomputer 122 and a reproduction starting point in the reproduction mode. A control bus 124 is configured to allow a control signal from the main microcomputer 122 and a signal from the operation key 121 to be transferred.

[Exemplary Control Process]

Figure 2:
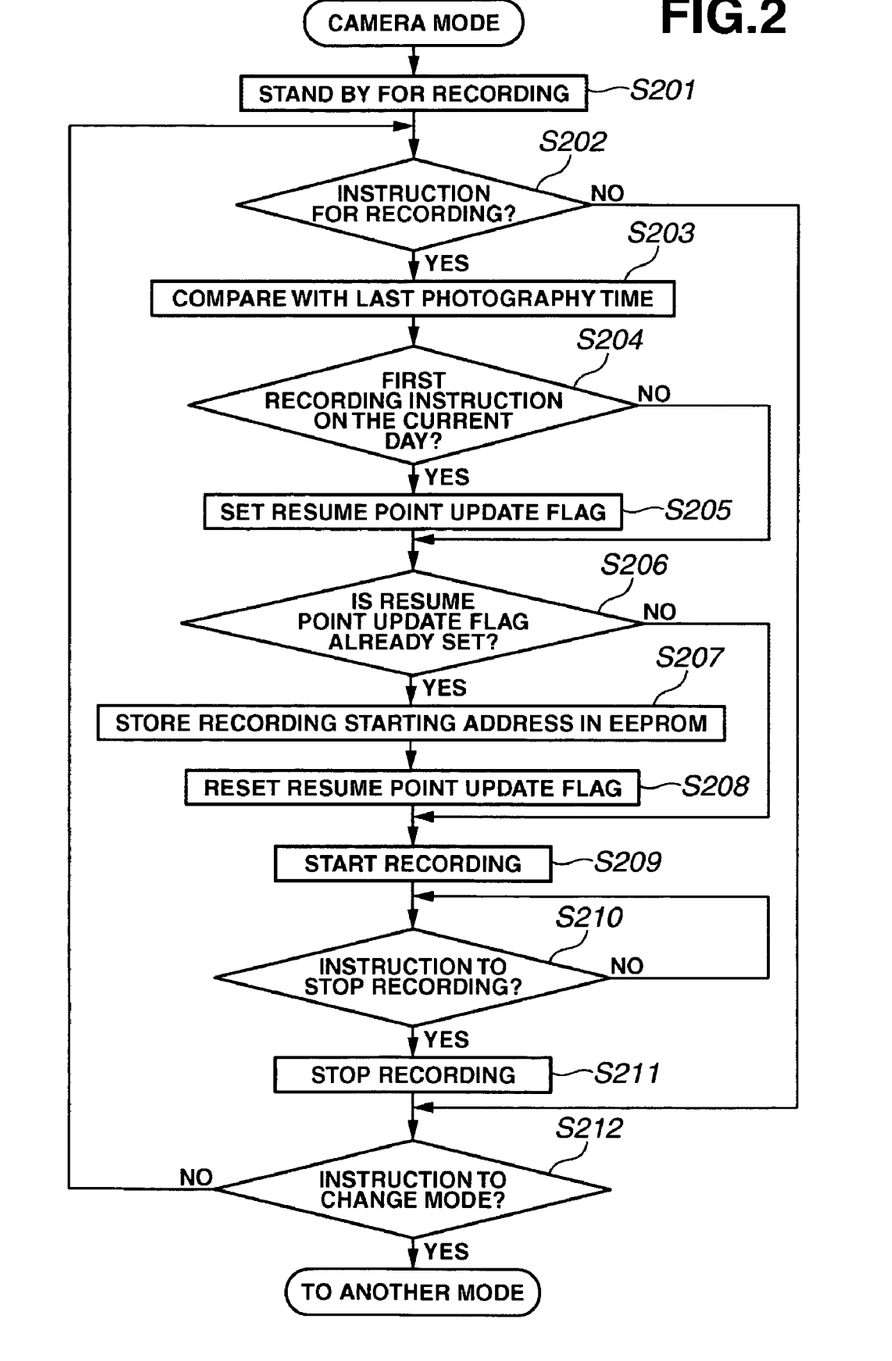
FIG. 2 is a flowchart showing exemplary process steps in a camera mode, which are performed by the video camera in FIG. 1.

An exemplary control process performed by the digital video camera 100 having the above-described configuration is now herein described below. FIG. 2 is a flow chart showing exemplary process steps performed by the digital video camera 100 according to the embodiment. Such processing steps may be performed in the main microcomputer 122 while in the camera mode (or record mode). The process during the camera mode is performed responsive to a user selecting the camera mode by operating the mode switch 121B.

First, the digital video camera 100 stands by for recording (step S201) and waits for an instruction for recording (step S202). When a user operates a trigger switch (not shown) included in the operation key 121 to generate an instruction for recording, the main microcomputer 122 compares the photography time of the most recently recorded content among the contents recorded on the optical disc 118 with a current time (step S203). Then, it is determined whether the instruction for recording in step S202 is the first instruction for recording on the current day (step S204).

If a result of this determination indicates the first recording instruction on the current day, the main microcomputer 122 sets a resume point update flag (step S205). On the other hand, if it is not the first recording instruction, the main microcomputer 122 does not set the resume point update flag. The resume point is defined as an address on the optical disc 118 which indicates a reproduction starting position with which reproduction starts responsive to the user changing the video camera to the reproduction mode and generating an instruction for reproduction.

Then, the main microcomputer 122 checks the resume point update flag (step S206). If the resume point update flag is already set, an address on the optical disc 118 at which a content is to be recorded now is stored in the EEPROM 123 as resume point information (step S207). Then, the resume point update flag is reset (step S208), and photographing and recording are started (step S209).

On the other hand, if a result of the check in step S206 indicates that the resume point update flag is not yet set, the main microcomputer 122 immediately starts recording in step S209 without storing resume point information.

Then, if an instruction to stop recording is generated (step S210), recording of data on the optical disc 118 is stopped (step S211). In this embodiment, a series of image data and audio data recorded during a period from an instruction to start recording to an instruction to stop recording is managed as one cut (content). Then, when an instruction to change the video camera to another mode or to turn off the power source is generated, the process of this flow ends (step S212). If the instruction to change the video camera to another mode is not generated, the process returns to step S202.

[Exemplary Process Steps During Reproduction Mode]

Figure 3:
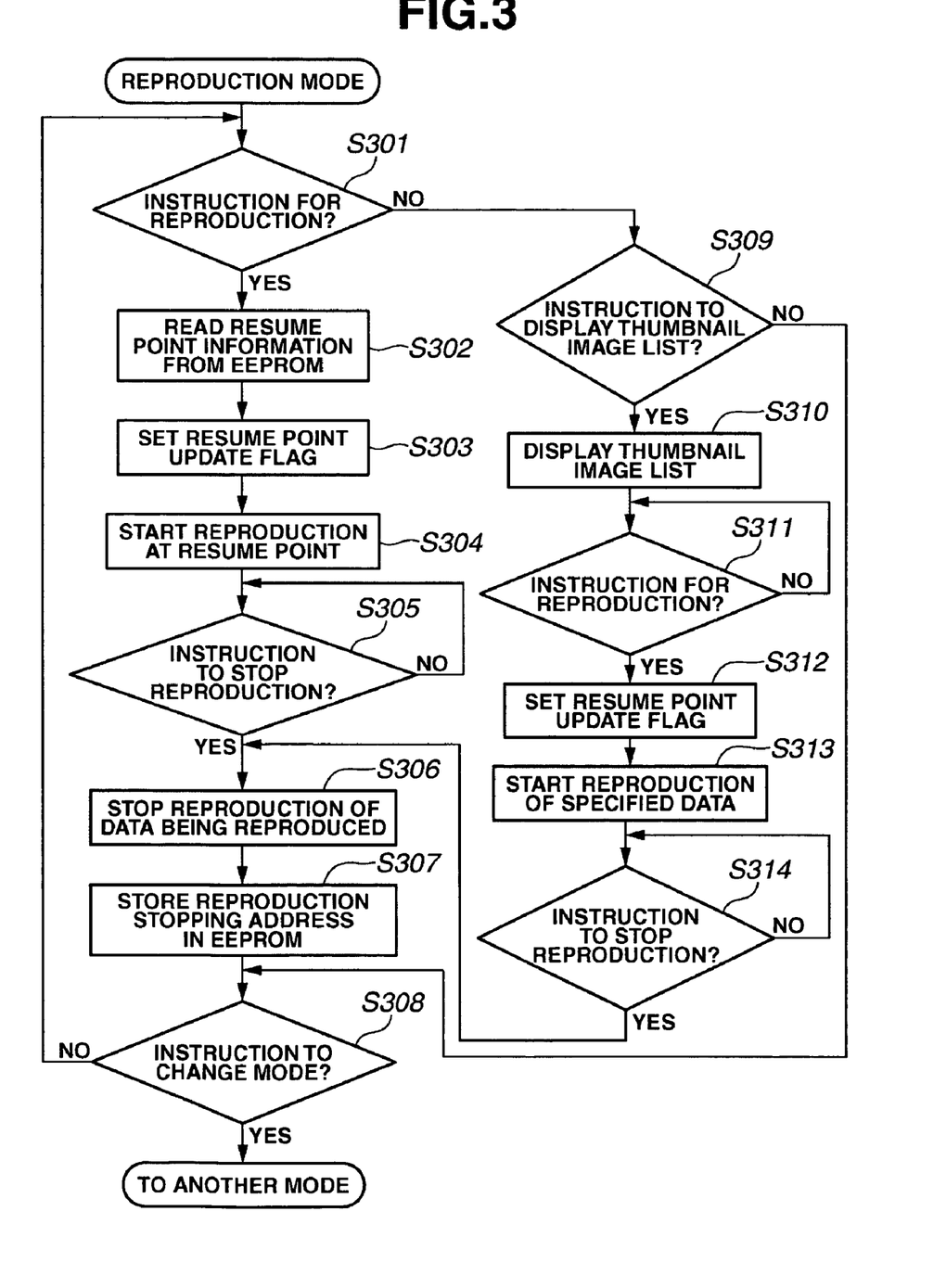
FIG. 3 is a flowchart showing exemplary process steps in a reproduction mode, which are performed by the video camera in FIG. 1.

FIG. 3 is a flow chart showing exemplary process steps during the reproduction mode which may be performed by the main microcomputer 122 in the digital video camera 100. The reproduction mode process is performed responsive to a user selecting the reproduction mode (or play) by operating the mode switch 121B.

When the digital video camera 100 is changed to the reproduction mode, the main microcomputer 122 determines whether the user has operated a reproduction switch (not shown) included in the operation key 121 (step S301). If the reproduction switch has been operated, the main microcomputer 122 reads resume point information stored in the EEPROM 123 (step S302). Then, the main microcomputer 122 sets the resume point update flag (step S303) and starts reproduction of a content with the resume point (step S304). During reproduction, the main microcomputer 122 waits for an instruction to stop reproduction. If the instruction to stop reproduction is generated (step S305), the main microcomputer 122 stops reproduction (step S306).

Subsequently, the main microcomputer 122 records, on the EEPROM 123, a reproduction stopping address on the optical disc 118 as resume point information (step S307). In this instance, if the resume point information is already stored in the EEPROM 123, this value is updated. In addition, in this instance, the resume point update flag remains set and is not reset.

Then, if an instruction to change the digital video camera 100 from the reproduction mode to another mode is generated, the reproduction mode process ends (step S308). If the instruction to change the modes is not generated, the process returns to step S301.

If the instruction for reproduction is not generated in step S301, the main microcomputer 122 determines whether an instruction to display a thumbnail image list is generated with a thumbnail image (representative image) list displaying switch (not shown) included in the operation key 121 (step S309). When the instruction to display a thumbnail image list is generated, the list of thumbnail images of contents recorded on the optical disc 118 is displayed on the LCD 112 (step S310). Then, when the user operates the operation key 121 to select a desired thumbnail image and to generate an instruction to start reproduction (step S311), the resume point update flag is set (step S312), and reproduction of the specified content is started (step S313). Then, when an instruction to stop reproduction is generated (step S314), the process proceeds to step S306.

[Exemplary Process When Main Power Source is ON]

Figure 4:
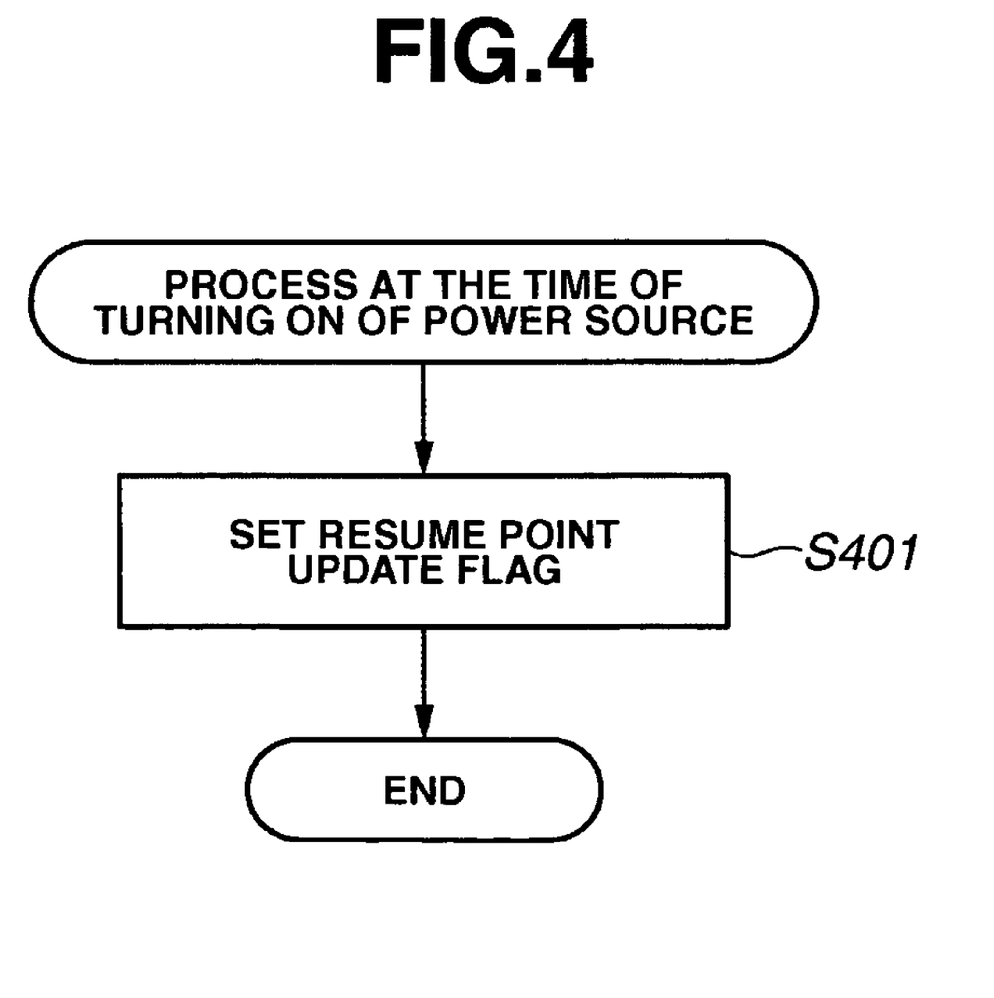
FIG. 4 is a flow chart showing exemplary process steps when a power source of a camera body is turned on, which are performed by the video camera in FIG. 1.

FIG. 4 is a flow chart showing exemplary process steps performed by the digital video camera 100 when a main power source is turned on according to this embodiment. This process is performed when a user operates the power source switch 121A to turn on the power source of the main body of the digital video camera 100. In particular, when the main power source is turned on, the main microcomputer 122 sets the resume point update flag (step S401).

[Exemplary Reproduction]

Figure 5A:
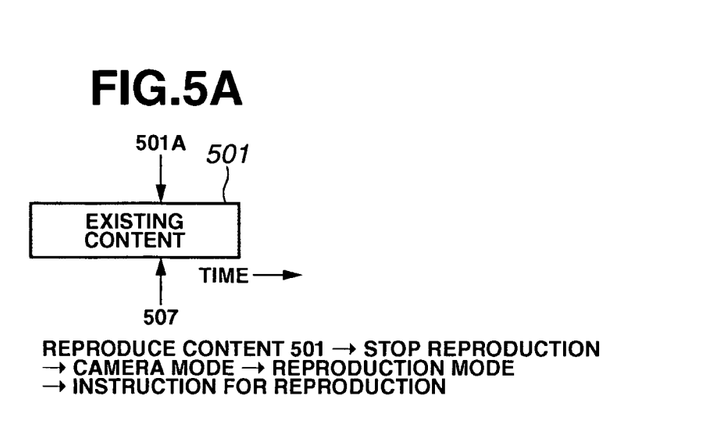
FIGS. 5A, 5B and 5C are diagrams showing states of contents which are reproduced according to control processes performed by the video camera in FIG. 1.
Figure 5B:
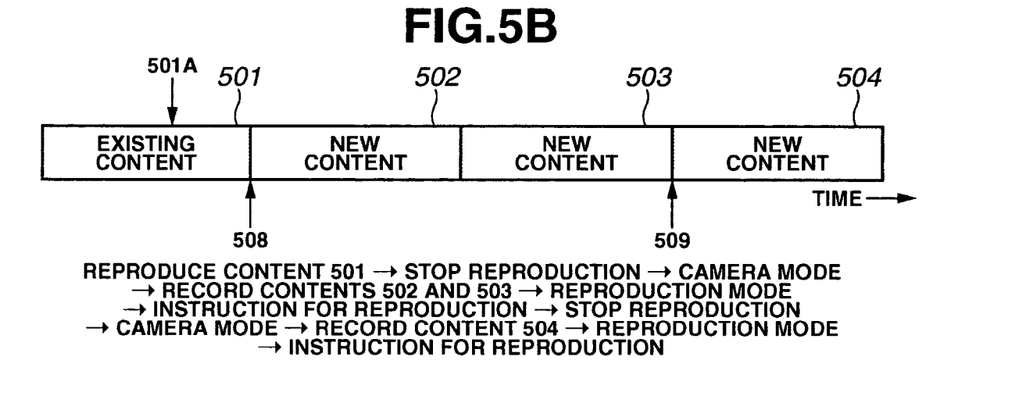
Figure 5C:
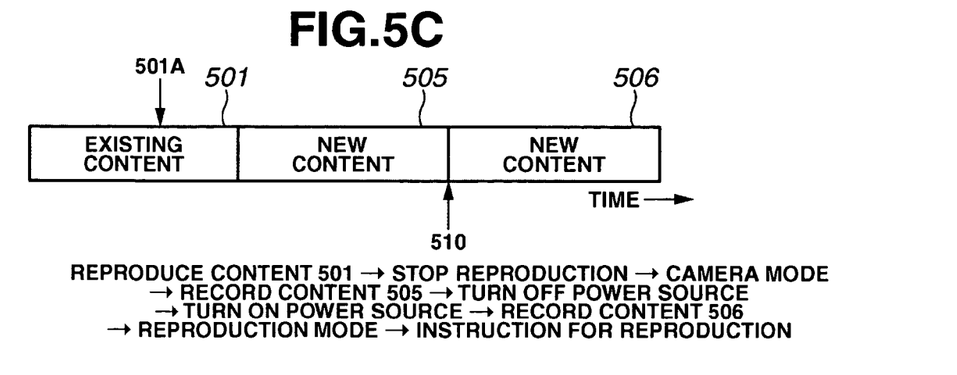

FIGS. 5A, 5B and 5C are diagrams showing various examples/scenarios of reproduction corresponding to the processes described with reference to FIGS. 2 to 4. In FIGS. 5A, 5B and 5C, it is assumed that a content 501 is already recorded on the optical disc 118.

FIG. 5A shows the case of operating the process in order of reproducing the existing content 501 in the reproduction mode, stopping reproduction, changing to the camera mode, changing to the reproduction mode without recording a new content, and generating an instruction for reproduction.

In this case, although the resume point update flag is set in step S303 (from FIG. 3), the resume point information stored in the EEPROM 123 in step S307 is not updated after that and is set to an effective state. Therefore, the reproduction starting position is a position 501A in which reproduction of the existing content 501 has been stopped last time, as shown by a point 507.

FIG. 5B shows the case of operating the process in order of reproducing the content 501 in the reproduction mode, stopping reproduction, changing to the camera mode, recording contents 502 and 503, changing to the reproduction mode, starting reproduction, stopping reproduction, recording a content 504, changing to the reproduction mode, and generating an instruction for reproduction.

In this scenario, when reproduction of the content 501 is stopped, the resume point update flag is set. Then, when the content 502 is recorded in the camera mode, a recording starting address 508 of the content 502 is stored in the EEPROM 123 as resume point information in step S207. When the content 503 is recorded, since the resume point update flag is already reset, the resume point information stored in the EEPROM 123 is not updated. Therefore, the reproduction starting position in a case where the digital video camera 100 has changed to the reproduction mode after recording the content 503 is a point 508, which corresponds to the recording starting position of the content 502. Then, when the content 504 is recorded, a recording starting address 509 of the content 504 is stored in the EEPROM 123 as resume point information. Therefore, the reproduction starting position in the reproduction mode is a point 509 corresponding to the recording starting position of the content 504.

FIG. 5C shows the case of operating the process in order of reproducing the content 501 in the reproduction mode, stopping reproduction, changing to the camera mode, recording a content 505, turning off the power source of the main body, turning on the power source of the main body, recording a content 506 in the camera mode, changing to the reproduction mode, and generating an instruction for reproduction.

In this scenario, when the content 505 is recorded, a recording starting address of the content 505 is stored in the EEPROM 123 as resume point information in step S207. However, when the power source is turned off and, thereafter, turned on, the resume point update flag is set in step S401. Then, when the content 506 is recorded, a recording starting address 510 of the content 506 is stored in the EEPROM 123 as resume point information in step S207. Therefore, the reproduction starting position in the reproduction mode is a point 510 corresponding to the recording starting position of the content 506.

As described above, in this embodiment, the reproduction starting position in a case where an instruction for reproduction is generated is suitably set according to the mode changing state of the digital video camera 100. Thus, the reproduction starting position of a content is changed accordingly. Therefore, a user can reproduce, view and listen to an appropriate content without performing a special operation.

In addition, although an optical disc is used as a recording medium in this embodiment, a hard disc drive or the like, which is a recording medium having larger capacity, can be used.

Second Exemplary Embodiment

A digital video camera 100 serving as an imaging apparatus according to a second embodiment of the present invention is first described. Here, the architecture of the digital video camera 100 used in the second embodiment is similar to that of the architecture illustrated in FIG. 1. However, with regard to the second embodiment, part of the process in the camera mode is different from that of the digital video camera 100 of the first embodiment.

[Exemplary Control Process]

Figure 6:
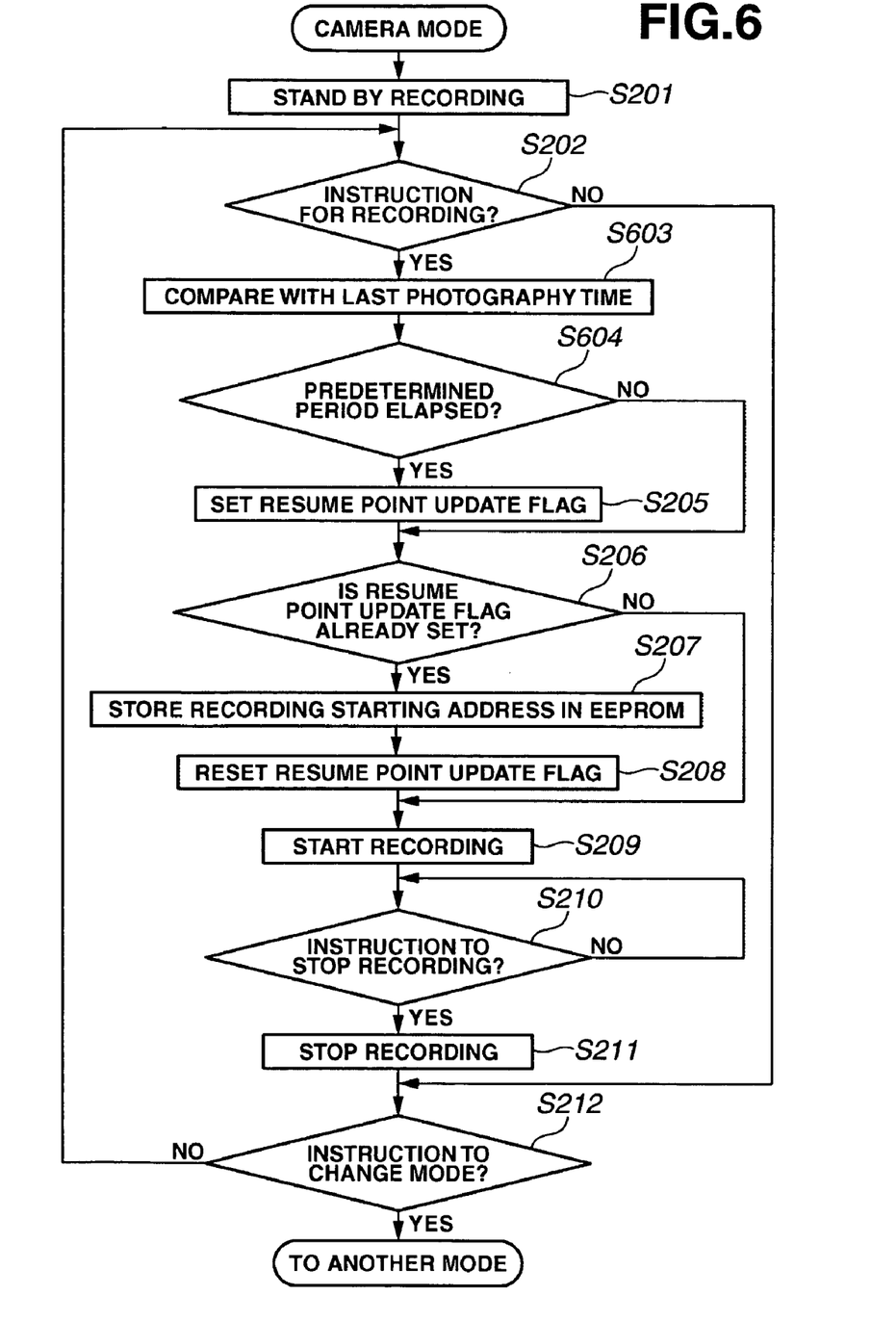
FIG. 6 is a flow chart showing exemplary process steps in a camera mode which are performed by a video camera according to a second embodiment of the present invention.

FIG. 6 is a flow chart showing exemplary process steps in the camera mode performed by the video camera 100 of this embodiment. In FIG. 6, the same step numbers are assigned to similar steps as those of FIG. 2, and a description thereof is not repeated here.

In FIG. 6, in step S603, the recording time (date and time) of a content that has been last recorded is compared with the current time (date and time). Then, if in step S604 it is determined that a predetermined period has elapsed from the recording time of the last content, the process proceeds to step S205. The elapsed time is calculated, by using the main microcomputer 122, with a predetermined formula based on the recording date of the content and the current time. On the other hand, if the predetermined period has not yet elapsed, the process skips step S205 and proceeds to step S206. The process other than the above steps is similar to the process shown in FIG. 2.

[Exemplary Reproduction]

The process in the reproduction mode which is performed in the video camera 100 of this embodiment is similar to the process shown in the flowchart of FIG. 3, therefore, a description thereof is not repeated.

Figure 7A:
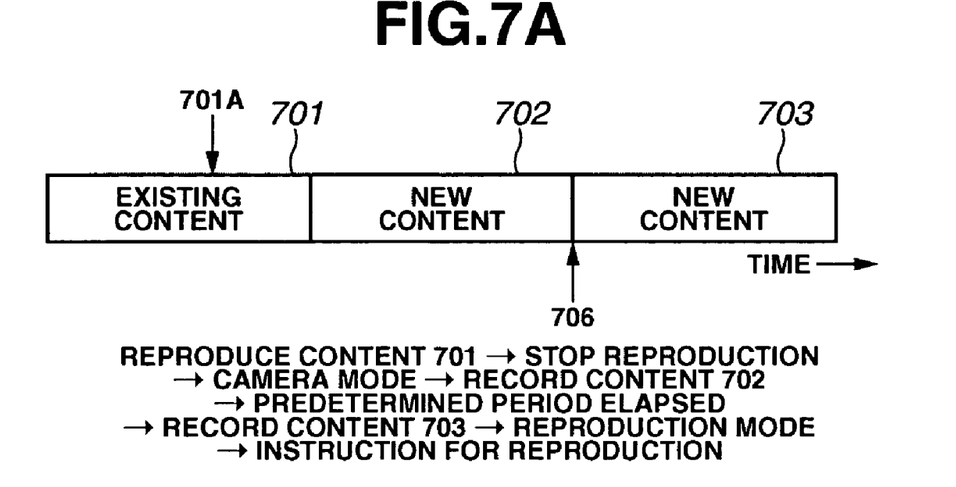
FIGS. 7A and 7B are diagrams showing states of contents which are reproduced according to control processes performed by the video camera according to the second embodiment.
Figure 7B:
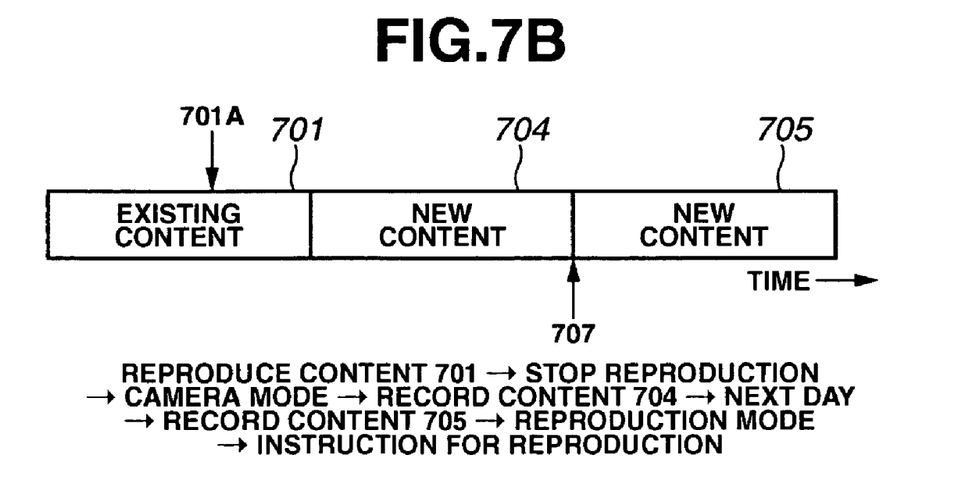

FIGS. 7A and 7B are diagrams showing examples of results of the control process performed in the video camera 100 according to this embodiment. In FIGS. 7A and 7B, it is assumed that one content is already recorded on the optical disc 118.

FIG. 7A shows the case of operating the process in order of reproducing a content 701 in the reproduction mode, stopping reproduction, changing to the camera mode, recording a content 702, a predetermined period elapsed (e.g., 3 hours or more), recording a content 703, changing to the reproduction mode, and generating an instruction for reproduction.

In this case, when the content 702 is recorded, a recording starting address of the content 702 is stored in the EEPROM 123 as resume point information in step S207 in FIG. 6. However, when the content 703 is recorded after the elapse of 3 hours or more (for example), the resume point update flag is set in the process of steps S603, S604, and S205 in FIG. 6. After that, a recording starting address 706 of the content 703 is stored in the EEPROM 123 as resume point information in step S207. Therefore, the reproduction starting position in the reproduction mode corresponds to the recording starting position 706 of the content 703.

FIG. 7B shows an example of operation in a case where the video camera sets the resume point update flag when an instruction for recording is generated on or after the next day of the day when the last content has been recorded, as in FIG. 2. More specifically, FIG. 7B shows the case of operating the process in order of reproducing the content 701 in the reproduction mode, stopping reproduction, changing to the reproduction mode, recording a content 704, recording a content 705 on the next day, changing to the reproduction mode, and generating an instruction for reproduction.

In this scenario, when the content 704 is recorded, a recording starting address of the content 704 is stored in the EEPROM 123 as resume point information in step S207. However, when the content 705 is recorded on the next day, the resume point update flag is set in the process of steps S603, S604, and S205. Then, in step S207, a recording starting address 707 of the content 705 is stored in the EEPROM 123 as resume point information. Therefore, the reproduction starting position in the reproduction mode corresponds to the recording starting position 707 of the content 705.

Other Embodiments, Features and Aspects of the Present Invention

In another exemplary embodiment, the recorded moving images (contents) may be displayed as a list in a index display when the reproduction mode is set. A user can find the desired scene quickly using the index display. In that case, the reproduction starting position may be controlled as below. The reproduction starting position may be selected in accordance with the number of newly recorded contents. For example, if the number of the newly recorded contents is more than a predetermined number, a position of the beginning of a newly recorded image (the latest newly recorded image) is set as the reproduction starting position. On the other hand, if the number of the recorded image contents is not more than the predetermined number, a reproduction stopping position in the reproduction mode performed before (or a position of the newly recorded image immediate after the reproduction stopping position in the reproduction mode performed before) is set as the reproduction starting position. The predetermined number is the number of indexes which can be simultaneously displayed on a display. The number of the newly recorded contents is calculated by the main microcomputer 122 based on a record number of the newly recorded contents.

Furthermore, although an optical disc is used as a recording medium in this embodiment, a hard disc drive, which is a recording medium having larger capacity, can be used in the various embodiments of the present invention.

In addition, the present invention can be realized by supplying a storage medium to a system or an apparatus, and reading and performing program code stored in the storage medium with a computer (or CPU, MPU) in the system or apparatus. Here, the storage medium records program code of software for realizing functions of the above-described embodiments. In this case, the program code itself, which is read from the storage medium, realizes the novel function of the present invention, and the program code and the storage medium storing the program code constitute the present invention.

The storage medium for supplying the program code includes, for example, a flexible disc, a hard disc, a magneto-optical disc, a CD-ROM, a CD-R, a CD-RW, a DVD-ROM, a DVD-RAM, a DVD-RW, a DVD+RW, a magnetic tape, a nonvolatile memory card, and a ROM. Further, the program code can be supplied from a server computer via a communication network.

Furthermore, the functions of the above-described embodiments can be realized by performing program code read by the computer. Further, on the basis of an instruction of the program code, an operating system (OS) or the like, which is running on the computer, performs all or a part of the actual process, and thereby the functions of the above-described embodiment can be realized by this process.

Furthermore, program code read from a storage medium is written to a memory provided at a function extension board inserted into a computer or a function extension unit connected to the computer. Then, on the basis of the instruction of the program code, a CPU or the like, which is provided at the function extension board or the function extension unit, performs all or a part of the actual process, and thereby the functions of the above-described embodiments can be realized by this process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-027867 filed Feb. 3, 2005, which is hereby incorporated by reference herein in its entirety.

What is claimed is:

1. An imaging apparatus comprising:
   an imaging unit configured to generate a moving image signal;
   a recording and reproduction unit configured to record the moving image signal generated by the imaging unit during a period from an instruction to start photographing to an instruction to stop photographing as one cut on a recording medium, and to reproduce the moving image signal from the recording medium;
   a mode setting unit configured to set one of a reproduction mode for reproducing the moving image signal recorded on the recording medium and a recording mode for recording the moving image signal on the recording medium;
   a designating unit configured to designate one of a plurality of cuts recorded on the recording medium as a reproduction start cut, the designating unit, in response to the recording and reproduction unit recording the cut first in the recording mode, automatically designating a cut which is different from a cut recorded on the recording medium before the first cut is recorded and is recorded first in the recording mode among a plurality of cuts recorded on the recording medium as the reproduction start cut;

a selecting unit configured to select the cut designated as the reproduction start cut by the designating unit among the plurality of cuts recorded on the recording medium responsive to a change from the recording mode to the reproduction mode by the mode setting unit;

a control unit configured to control the recording and reproducing unit to reproduce the moving image signal starting with the reproduction start cut selected by the selecting unit in accordance with an instruction to start reproduction in the reproducing mode.

2. An imaging apparatus comprising:

an imaging unit configured to generate a moving image signal;

a recording and reproduction unit configured to record the moving image signal generated by the imaging unit during a period from an instruction to start photographing to an instruction to stop photographing as one cut on a recording medium, and to reproduce the moving image signal from the recording medium;

a mode setting unit configured to set one of a reproduction mode for reproducing the moving image signal recorded on the recording medium and a recording mode for recording the moving image signal on the recording medium;

a memory which stores an information representing a reproduction start cut among a plurality of cuts recorded on the recording medium;

an updating unit configured to, in response to the recording and reproducing unit recording a cut first in the recording mode, automatically update the information representing the reproduction start cut stored in the memory by the first recorded cut;

a selecting unit configured to, responsive to a change from the recording mode to the reproduction mode by the mode setting unit, select the reproduction start cut represented by the information stored in the memory among a plurality of cuts recorded on the recording medium;

a control unit configured to control the recording and reproducing unit to reproduce the moving image signal starting with the reproduction start cut selected by the selecting unit in accordance with an instruction to start reproduction in the reproducing mode.

3. An imaging apparatus comprising:

an imaging unit configured to generate a moving image signal;

a recording and reproduction unit configured to record the moving image signal generated by the imaging unit during a period from an instruction to start photographing to an instruction to stop photographing as one cut on a recording medium, and to reproduce the moving image signal from the recording medium;

a mode setting unit configured to set one of a reproduction mode for reproducing the moving image signal recorded on the recording medium and a recording mode for recording the moving image signal on the recording medium;

a memory which stores an information representing a reproduction start cut among a plurality of cuts recorded on the recording medium;

an updating unit configured to, in response to the recording and reproducing unit recording a cut first after a predetermined period has elapsed since the recording and reproducing unit stops recording the moving image signal, automatically updating the information representing the reproduction start cut stored in the memory by the first recorded cut;

a selecting unit configured to, responsive to setting the reproduction mode by the mode setting unit, select the reproduction start cut represented by the information stored in the memory among a plurality of cuts recorded on the recording medium;

a control unit configured to control the recording and reproducing unit to reproduce the moving image signal starting with the reproduction start cut selected by the selecting unit in accordance with an instruction to start reproduction in the reproducing mode.

4. An imaging apparatus comprising:

an imaging unit configured to generate an image signal;

a recording and reproduction unit configured to record the image signal generated by the imaging unit on a recording medium, and to reproduce the image signal from the recording medium;

a mode setting unit configured to set one of a reproduction mode for reproducing the image signal recorded on the recording medium and a recording mode for recording the image signal on the recording medium;

a designating unit configured to designate one of a plurality of image signals recorded on the recording medium as a reproduction start image, the designating unit, in response to the recording unit recording the image signal first in the recording mode, automatically designating an image signal which is different from an image signal recorded on the recording medium before the first image signal is recorded and is recorded first in the recording mode among a plurality of image signals recorded on the recording medium as the reproduction start image;

a selecting unit configured to select the image signal designated as the reproduction start image by the designating unit among the plurality of image signals recorded on the recording medium responsive to a change from the recording mode to the reproduction mode by the mode setting unit;

a control unit configured to control the recording and reproducing unit to reproduce the image signal starting with the image signal selected by the selecting unit in accordance with an instruction to start reproduction in the reproducing mode.

5. An imaging apparatus comprising:

an imaging unit configured to generate an image signal;

a recording and reproduction unit configured to record the image signal generated by the imaging unit, and to reproduce the image signal from the recording medium;

a mode setting unit configured to set one of a reproduction mode for reproducing the image signal recorded on the recording medium and a recording mode for recording the image signal on the recording medium;

a memory which stores an information representing a reproduction start image among a plurality of image signals recorded on the recording medium;

an updating unit configured to, in response to the recording and reproducing unit recording an image signal first in the recording mode, automatically update the information representing the reproduction start image cut stored in the memory by the first recorded image signal;

a selecting unit configured to, responsive to a change from the recording mode to the reproduction mode by the mode setting unit, select the reproduction start image represented by the information stored in the memory among a plurality of pieces of image signal recorded on the recording medium;

a control unit configured to control the recording and reproducing unit to reproduce the image signal starting with the reproduction start image selected by the selecting unit in accordance with an instruction to start reproduction in the reproducing mode.

6. An imaging apparatus comprising:

an imaging unit configured to generate an image signal;

a recording and reproduction unit configured to record the image signal generated by the imaging unit, and to reproduce the image signal from the recording medium;

a mode setting unit configured to set one of a reproduction mode for reproducing the image signal recorded on the recording medium and a recording mode for recording the image signal on the recording medium;

a memory which stores an information representing a reproduction start cut among a plurality of cuts recorded on the recording medium;

an updating unit configured to, in response to the recording and reproducing unit recording a cut first after a predetermined period has elapsed since the recording and reproducing unit records the image signal, automatically updating the information representing the reproduction start image stored in the memory by the first recorded image signal;

a selecting unit configured to, responsive to setting the reproduction mode by the mode setting unit, select the reproduction start image represented by the information stored in the memory among a plurality of pieces of image signal recorded on the recording medium;

a control unit configured to control the recording and reproducing unit to reproduce the image signal starting with the reproduction start image selected by the selecting unit in accordance with an instruction to start reproduction in the reproducing mode.

* * * * *